(12) United States Patent
Malskorn

(10) Patent No.: US 10,723,223 B2
(45) Date of Patent: Jul. 28, 2020

(54) FUEL CAP

(71) Applicant: MAGNA STEYR Fuel Systems GmbH, Grevenbroich (DE)

(72) Inventor: Ralf Malskorn, Neuss (DE)

(73) Assignee: MAGNA STEYR FUEL SYSTEMS GMBH, Grevenbroich (DE)

( * ) Notice: Subject to any disclaimer, the term of this patent is extended or adjusted under 35 U.S.C. 154(b) by 0 days.

(21) Appl. No.: 14/515,861

(22) Filed: Oct. 16, 2014

(65) Prior Publication Data
US 2015/0108131 A1    Apr. 23, 2015

(30) Foreign Application Priority Data

Oct. 17, 2013   (DE) .................. 10 2013 017 285
Oct. 21, 2013   (EP) .................... 13189499

(51) Int. Cl.
*B60K 15/04*    (2006.01)

(52) U.S. Cl.
CPC ...... *B60K 15/0409* (2013.01); *B60K 15/0406* (2013.01); *B60K 2015/0438* (2013.01); *B60K 2015/0451* (2013.01); *B60K 2015/0461* (2013.01); *Y10T 70/592* (2015.04)

(58) Field of Classification Search
CPC ............ B60K 15/0406; B60K 15/0409; B60K 2015/0438; B60K 2015/0451; B60K 2015/0461; B60K 2015/0561; B60K 2015/0584; B60K 2015/0432; B60K 2015/0464; B60K 2015/0483; B60K 2015/049

See application file for complete search history.

(56) References Cited

U.S. PATENT DOCUMENTS

| | | | | |
|---|---|---|---|---|
| 1,922,930 A * | 8/1933 | Darms | .............. | B60K 15/0403 137/408 |
| 4,164,302 A * | 8/1979 | Gerdes | .............. | B60K 15/0409 220/210 |
| 4,231,240 A * | 11/1980 | Fujita | ................ | B60K 15/0409 220/210 |
| 4,342,208 A * | 8/1982 | Evans | ............... | B60K 15/0409 220/210 |
| 4,567,994 A * | 2/1986 | Hofmann | .......... | B60K 15/0406 220/234 |
| 4,881,578 A * | 11/1989 | Rich | ............... | B60K 15/03504 137/588 |

(Continued)

FOREIGN PATENT DOCUMENTS

| | | |
|---|---|---|
| CN | 201941721 U | 8/2011 |
| CN | 202685922 U | 1/2013 |

(Continued)

*Primary Examiner* — Andrew T Kirsch
(74) *Attorney, Agent, or Firm* — Jordan IP Law, LLC; Todd A. Vaughn

(57) ABSTRACT

A closure system including a filler neck, a guide socket arranged inside the filler neck, a closure cap to be introduced between the filler neck and the guide socket and which is fastenable to the filler neck and an annular seal to be received in an annular groove of the closure cap and which is secured to an inner face of the filler neck. The annular seal is arranged between the filler neck and the guide socket such that a nozzle placed between the filler neck and the guide socket does not reach thereto.

16 Claims, 6 Drawing Sheets

(56) References Cited

U.S. PATENT DOCUMENTS

| | | | | |
|---|---|---|---|---|
| 5,042,678 | A * | 8/1991 | Munguia | B60K 15/04 137/199 |
| 6,568,553 | B2 * | 5/2003 | Hagano | B60K 15/04 220/293 |
| 6,651,707 | B2 * | 11/2003 | Zimmer | B60K 15/0406 141/286 |
| 6,814,251 | B2 * | 11/2004 | Hagano | B60K 15/0406 220/288 |
| 7,624,889 | B2 * | 12/2009 | Tharp | B60K 15/0406 220/210 |
| 9,096,120 | B2 * | 8/2015 | Jean | B60K 15/0406 |
| 2011/0168705 | A1 | 7/2011 | Siddiqui | |

FOREIGN PATENT DOCUMENTS

| | | |
|---|---|---|
| DE | 19934422 A1 | 2/2001 |
| DE | 102007043033 A1 | 3/2009 |
| EP | 0885764 A1 | 12/1998 |
| EP | 1162099 A2 | 12/2001 |
| EP | 1264725 A1 | 12/2002 |

* cited by examiner

FUEL CAP

CROSS-REFERENCE TO RELATED APPLICATIONS

The present application claims priority 35 U.S.C. § 119 to German Patent Publication No. DE 10 2013 017 285.3 (filed on Oct. 17, 2013) and European Patent Publication No. EP 13189499.0 (filed on Oct. 21, 2013), which are each hereby incorporated by reference in their respective entireties.

TECHNICAL FIELD

Embodiments relate to a closure system, in particular, for a fuel tank of a utility vehicle, and which includes a filler neck and a guide socket arranged inside the filler neck, a closure cap to be introduced between the filler neck and the guide socket.

BACKGROUND

Closure systems are known, per se, and normally use flat seals for sealing between the closure cap and the filler neck. Such seals, however, require a high screwing torque. As a result, it may arise that the closure cap is not screwed on as far as the end stops provided and consequently the closure cap is not fully sealed relative to the filler neck.

SUMMARY

Embodiments relate to enhanced closure systems of the type aforementioned, and particularly, to a closure system which reliably prevents the escape of fuel from a fuel tank. In this case, the function of a seal between the closure cap and the filler neck is intended to remain guaranteed over a lengthy period of time and not be reduced as a result of use and/or during a filling sequence of the tank.

In accordance with embodiments, a closure system may include at least one of: a filler neck; a guide socket arranged inside the filler neck; a closure cap to be introduced between the filler neck and the guide socket and which is to be fastened to the filler neck via a screw or bayonet connection; and an annular seal received in an annular groove of the closure cap and which is secured to an inner face of the filler neck and arranged sufficiently deeply between the filler neck and the guide socket such that a nozzle placed between the filler neck and the guide socket does not reach thereto.

In accordance with embodiments, a closure cap is to be fastened to a filler neck, in particular, via a bayonet closure. The bayonet closure, for example, may act between a sealing housing of the closure cap and the filler neck, such that when the closure cap is closed, an annular seal is sealed between the closure cap, in particular, the sealing housing of the closure cap and the filler neck.

In accordance with embodiments, the annular seal is fastened to the filler neck and, when the closure cap is closed, is received in an annular groove of the closure cap. Accordingly, when the closure cap is removed, the annular seal is not capable of being reached by a nozzle badly positioned between the filler neck and the guide socket. This is by virtue of the fact that the arrangement thereof between the filler neck and the guide socket. Moreover, no damage results since the spacing between the filler neck and the guide socket as well as the depth of the annular seal in the gap between the filler neck and the guide socket are selected such that a nozzle of conventional geometry, and in particular, conventional wall thickness, is not capable of reaching the annular seal.

Developments of the invention are set forth in the dependent claims, the description as well as the accompanying drawings.

In accordance with embodiments, the closure cap is to be fastened to the filler neck by way of a bayonet closure. The closure cap, in particular, a sealing housing of the closure cap, comprises one bayonet ramp, or even a pair of bayonet ramps. The filler neck has a cam which is to be guided in the bayonet ramp, or a pair cams in the case of a pair of bayonet ramps. The bayonet closure may, in particular, be designed to permit rapid opening and closing over a 90 degree rotation. The closure may be provided with self-locking and with a captive securing mechanism or device in order to prevent inadvertent release of the closure cap from the filler neck.

In accordance with embodiments, the closure cap has a sealing lip toward the filler neck. The sealing lip may be formed either from the closure cap, i.e., designed integrally therewith, or as a flexible material component connected to the closure cap by a positive or material connection. As a result, no foreign particles may collect above the annular seal and fall into the tank when opened.

In accordance with embodiments, the closure cap has a valve for aeration and/or deaeration in order to prevent negative pressure and/or overpressure in the tank.

In accordance with embodiments, the closure cap has a lock, and thus, may be locked.

In accordance with embodiments, the filler neck has a plurality of holes at the side for deaeration during a filling sequence of the tank. In this case, a self-closing flap preferably conceals the lock in order to prevent environmental influences, in particular, moisture, debris, dust, etc. from penetrating therein.

In accordance with embodiments, further components may also be integrated into the filler neck, such as, for example, a tank flap which is self-closing by way of a spring actuation or a further suitable construction, such as a silicone damper, and/or a replaceable filter, in particular as a diesel filter.

In accordance with embodiments, a closure system may include at least one of: a filler neck; a guide socket arranged inside the filler neck; a closure cap to be introduced between the filler neck and the guide socket and which is fastenable to the filler neck; an annular seal to be received in an annular groove of the closure cap and which is secured to an inner face of the filler neck, wherein the annular seal is arranged between the filler neck and the guide socket such that a nozzle placed between the filler neck and the guide socket does not reach thereto.

In accordance with embodiments, a closure system may include at least one of: a filler neck; a guide socket fixed on an outer face thereof to and arranged inside the filler neck; a closure cap fastenable to the filler neck so as to be arranged between the filler neck and the guide socket; a first seal to be received in an annular groove of the closure cap and which is secured to an inner face of the filler neck; and a second seal at the closure cap and arranged at an outer diameter of the filler neck, wherein the first seal is arranged between the filler neck and the guide socket such that a nozzle placed between the filler neck and the guide socket does not reach thereto.

DRAWINGS

Embodiments will be illustrated by way of example in the drawings and explained in the description below.

DESCRIPTION

Figure 1:
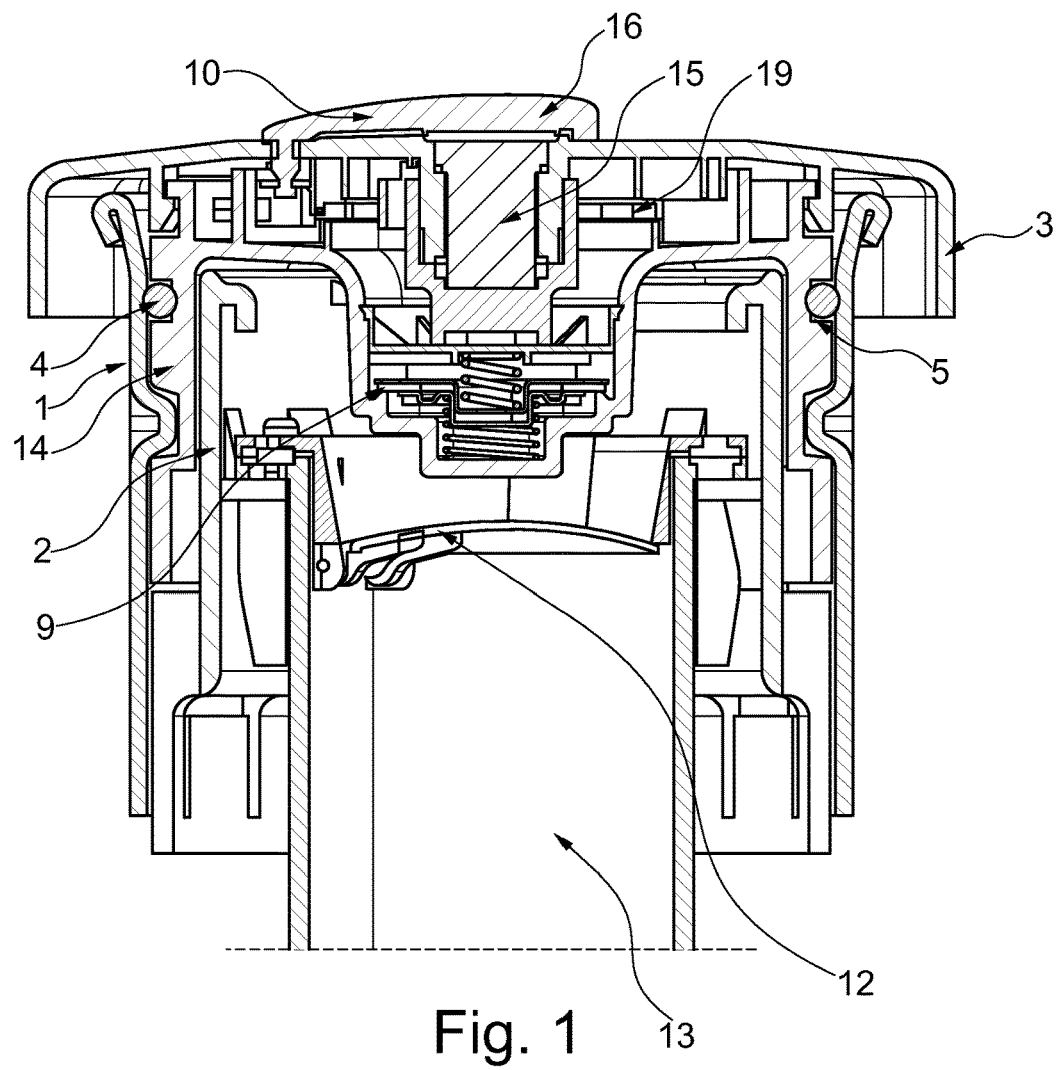
FIG. 1 illustrates a side sectional view of a closure system, in accordance with embodiments.

In FIG. 1 a section is illustrated through a closure system in accordance with embodiments with a filler neck 1 and a guide socket 2 arranged inside the filler neck 1, as well as a closure cap 3 incorporated between the filler neck 1 and the guide socket 2. The closure cap 3 has a valve 9 for aeration and/or deaeration of the tank in a sealing housing 14. The sealing housing 14 is fastened to the filler neck 1 by way of a bayonet closure. An annular seal 4, in particular, an O-ring seal, is arranged on the inner face of the filler neck 1 and received in an annular groove 5 of the closure cap 3.

Figure 2:
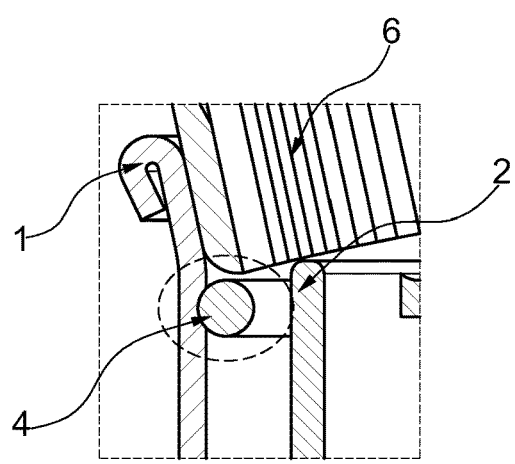
FIG. 2 illustrates a detailed view of the arrangement of an annular seal in of with FIG. 1, but without the closure cap.

As illustrated in the detailed view of FIG. 2, the annular seal 4 is arranged sufficiently deeply between the filler neck 1 and the guide socket 2, such that a nozzle 6 placed between the filler neck 1 and the guide socket 2, even in the event of misuse, is not able to come into contact with the annular seal 4 so that the annular seal 4 is not able to be damaged.

Figure 11:
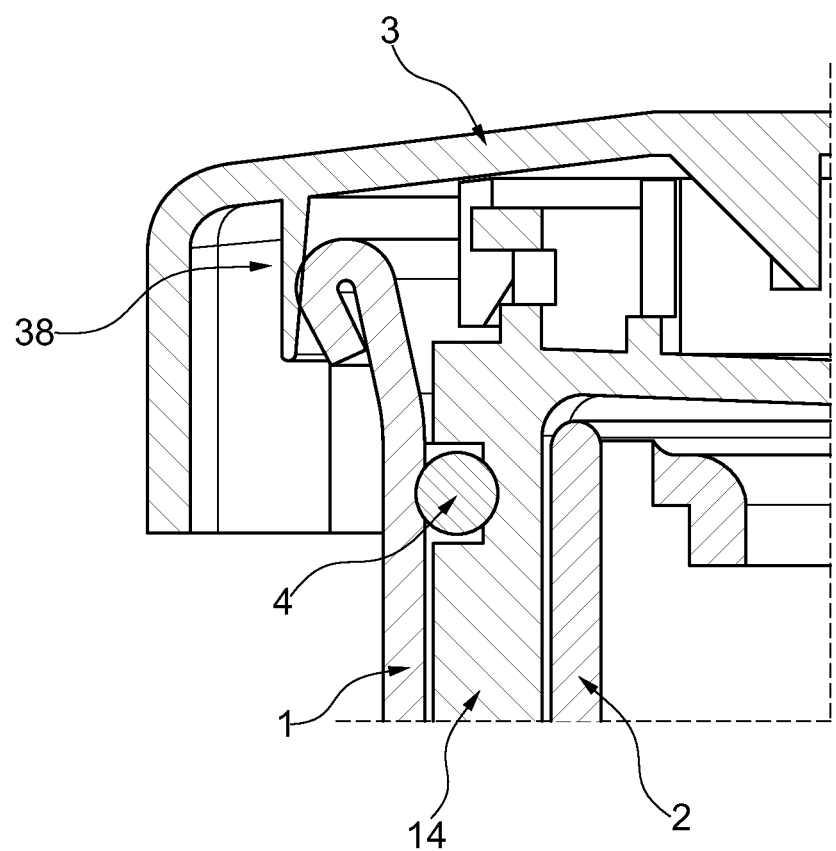
FIG. 11 illustrates a detailed view of the arrangement of the annular seal of FIG. 1 with the closure cap, in accordance with embodiments.

As illustrated in FIG. 11, so that no foreign particles may collect above the O-ring seal 4 which could fall into the tank when opened, a further external seal is integrated in the closure cap 3 as a resilient sealing lip 38. This seal may either be formed integrally from the closure cap 3 or as a flexible material component connected to the closure cap 3 by a positive or material connection.

Figure 6:
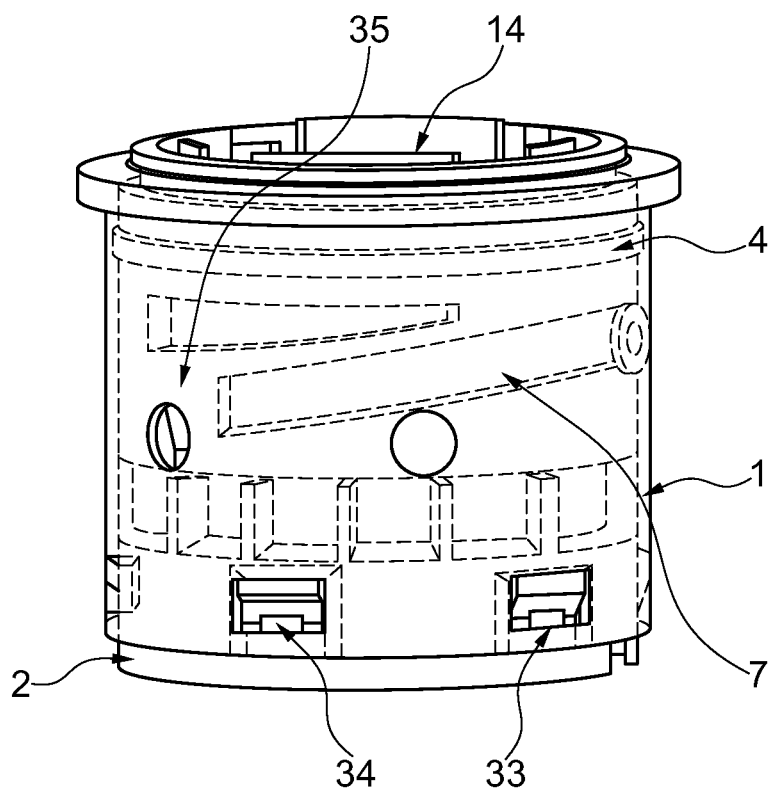
FIG. 6 illustrates a perspective view of a filler neck with the guide socket and sealing housing of the closure cap, in accordance with embodiments.
Figure 7:
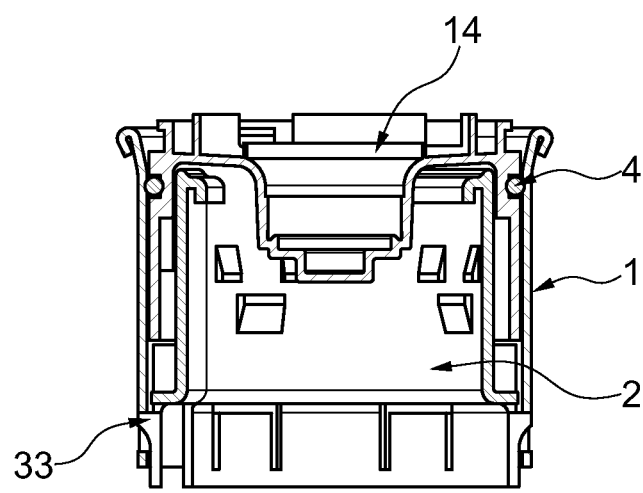
FIG. 7 illustrates a side sectional view of FIG. 6, in accordance with embodiments.

As illustrated in more detail in FIGS. 6 and 7, the guide socket 2 is fixed on the outer face thereof to the filler neck 1. On the inner face thereof, a self-closing spring-actuated tank flap 12 as a non-return flap and a replaceable filter 13, such as, for example, a diesel filter, are integrated in the guide socket 2. The closure cap 3 has on the upper face thereof a lock 10, preferably including a self-closing lock flap 16, a locking cylinder 15 and a locking bolt 19.

Figure 3:
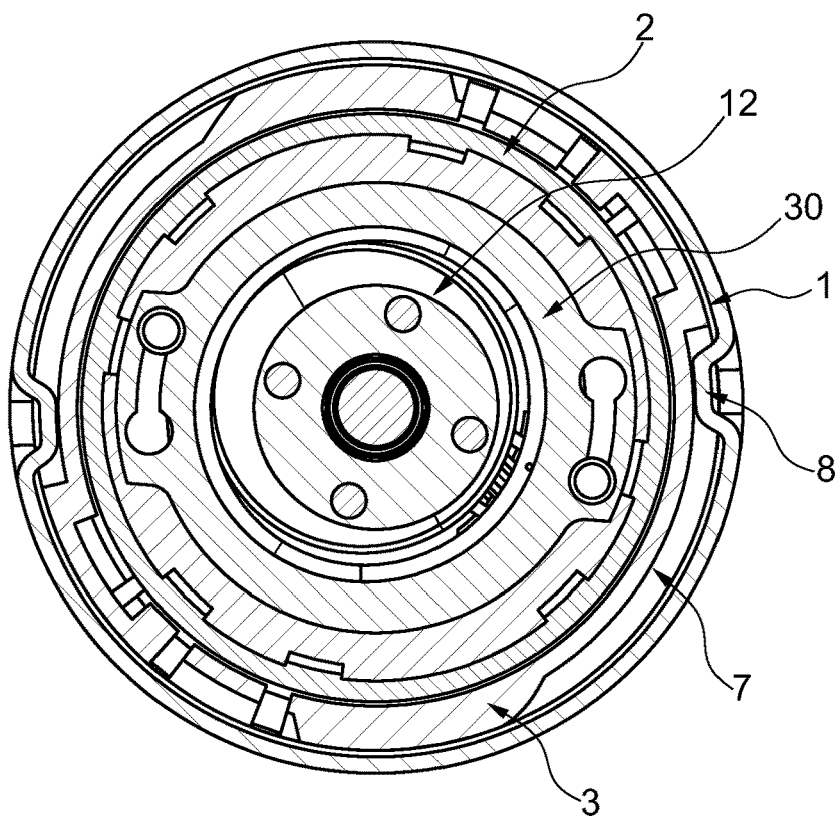
FIG. 3 illustrates a top sectional view of a closure system, in accordance with embodiments.

As illustrated in FIG. 3, a section through a closure system in accordance with embodiments includes a closure cap 3 that may be fastened to the filler neck 1 by way of a bayonet connection. The closure cap 3 has two bayonet ramps 7 and the filler neck 1 has two cams 8 able to be guided in the bayonet ramps 7.

Figure 4:
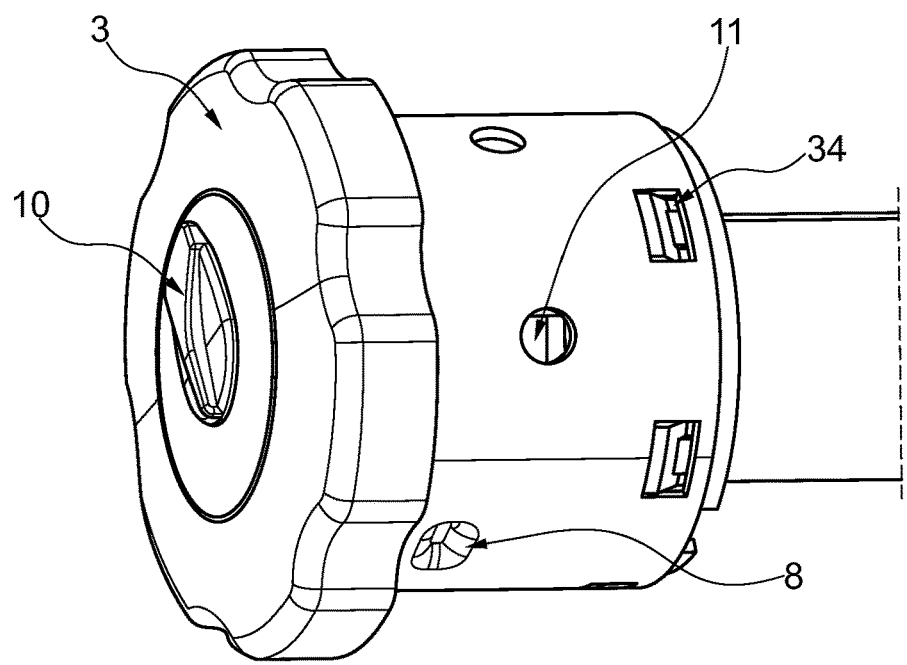
FIG. 4 illustrates a perspective view of a closure system, in accordance with embodiments.

As illustrated in FIG. 4, the filler neck 1 has a plurality of holes 11. The holes 11 serve for deaeration during a filling sequence of the tank and for regulating the filling level during a filling sequence of the tank, in order to achieve the greatest possible filling volume. Moreover, the filler neck 1 has cams 8 for guiding in bayonet ramps as well as apertures 34 for fixing and positioning the guide socket 2.

Figure 5:
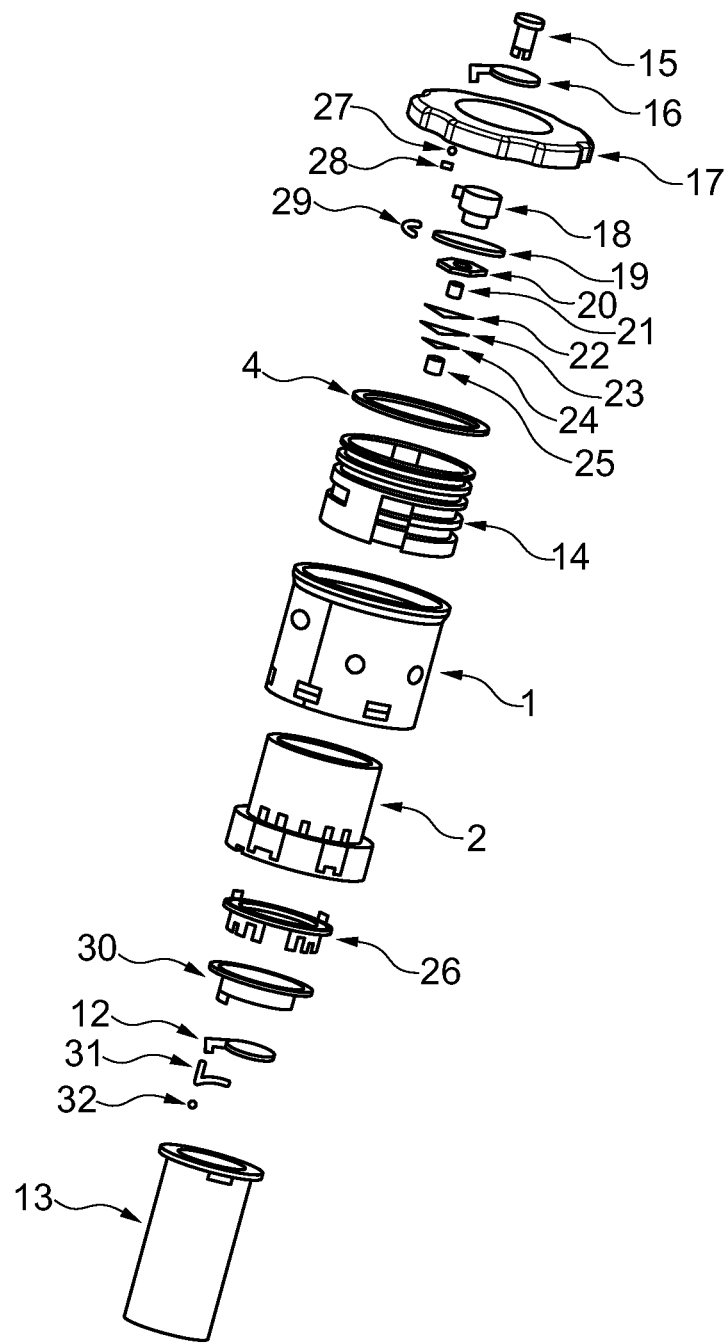
FIG. 5 illustrates an exploded view of the components of a closure system, in accordance with embodiments.

As illustrated in FIG. 5, a closure system in accordance with embodiments includes a locking cylinder 15, a lock flap 16, cap 17, eccentric sleeve 18, locking bolt 19, retaining flap 20, overpressure spring 21, overpressure disc 22, valve seal 23, negative pressure disc 24, negative pressure spring 25, sealing housing 14, filler neck 1, guide socket 2, filter and flap carrier 26, conical compression spring 27, retaining disc compression spring 28, flexion spring 29, annular seal 4, flap carrier 30, tank flap 12, flap spring 31, hinge pin flap 32 and filter 13.

As illustrated in FIG. 6, the apertures 34 on the filler neck 1 and the lugs 33 on the guide socket 2 for fixing the guide socket 2 are visible, as well as a bayonet ramp 7 with a retaining cam 35 as captive securing mechanism or device for the closure cap.

Figure 8:
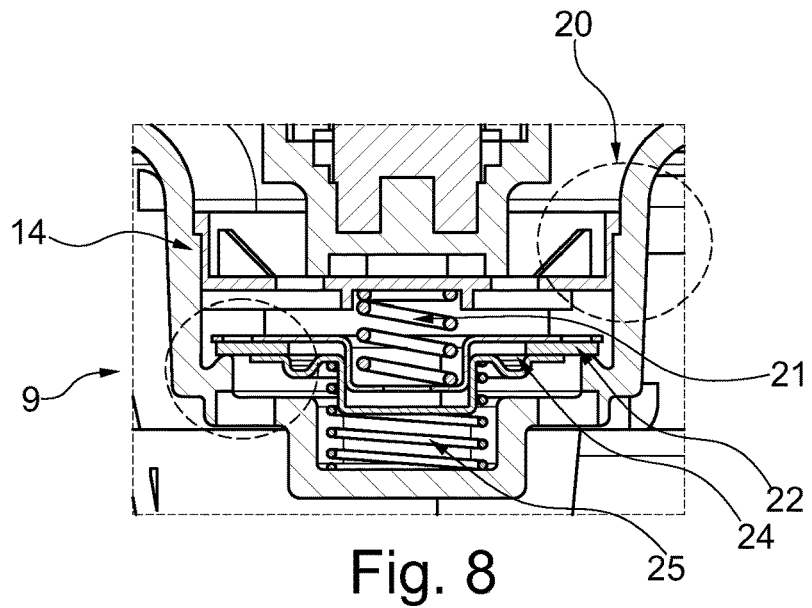
FIGS. 8 to 10 illustrate detailed views of the valve in the closure cap in three different operating states.
Figure 9:
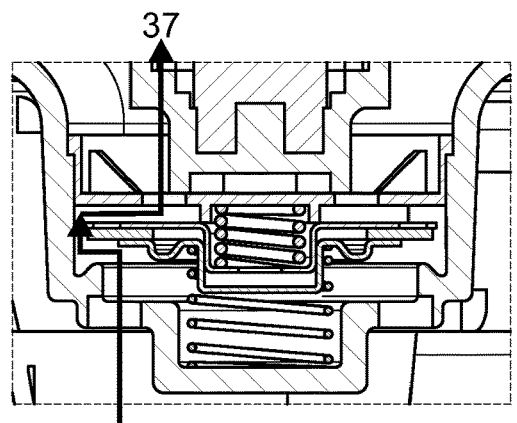
Figure 10:
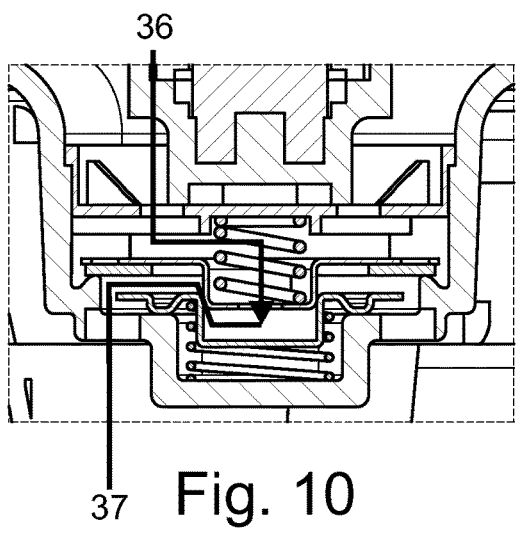

As illustrated in FIGS. 8 through 10, the function of the valve 9 integrated in the closure cap 3 is provided. A retaining cap 20 serves to secure the valve 9 in the event of an accident. In FIG. 8, the valve 9 is closed, and thus, in the initial position thereof. FIG. 9 illustrates the valve in the case of overpressure, in which the overpressure disc 22 is forced upwards, counter to the overpressure spring 21 and gas is able to escape from an inlet 36 to the outlet 37. FIG. 10 illustrates the reverse case in which, in the case of negative pressure, the negative pressure disc 24 is pulled downwards, counter to the negative pressure spring 25, and thus gas is able to enter from the inlet 36 to the outlet 37.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Filler neck
2 Guide socket
3 Closure cap
4 Annular seal
5 Annular groove
6 Nozzle
7 Bayonet ramp
8 Cam
9 Valve
10 Lock
11 Hole
12 Tank flap
13 Filter
14 Sealing housing
15 Locking cylinder
16 Lock flap
17 Cap
18 Eccentric sleeve
19 Locking bolt
20 Retaining flap
21 Overpressure spring 22 Overpressure disc
23 Valve seal
24 Negative pressure disc
25 Negative pressure spring
26 Filter and flap carrier
27 Conical compression spring
28 Retaining disc compression spring
29 Flexion spring
30 Flap carrier
31 Flap spring
32 Hinge pin flap
33 Lug
34 Aperture
35 Retaining cam
36 Inlet
37 Outlet
38 Sealing lip

What is claimed is:

1. A closure system for a fuel tank, the closure system comprising:
   a filler neck having a sidewall, the sidewall having a cam extending radially therefrom, and apertures and holes extending radially therethrough, wherein the holes are to deaerate the fuel tank during a filling sequence of the tank;
   a guide socket arranged concentrically inside of the filler neck, and having a portion thereof concentrically spaced from the filler neck, the guide socket having lugs received by the apertures to fix and position the guide socket relative to the filler neck, and a self-closing, spring-actuated tank flap and a replaceable filter, wherein the guide socket further includes a carrier, concentrically arranged therein, for connection to the self-closing, spring-actuated tank flap and the replaceable filter;
   a closure cap having a sealing housing concentrically arranged between the filler neck and the guide socket, the sealing housing having an annular groove in a sidewall thereof and a bayonet ramp at an outer surface thereof into which the cam is guided to fasten the closure cap to the filler neck; and
   an annular seal to be received in the annular groove of the sealing housing, and which is secured to an inner face of the filler neck,
   wherein the annular seal is arranged between the filler neck and the guide socket such that a nozzle placed between the filler neck and the guide socket does not reach thereto.

2. The closure system of claim 1, wherein the closure cap has a sealing lip arranged at the filler neck.

3. The closure system of claim 1, wherein the closure cap has a sealing lip arranged concentrically arranged inwardly relative to an outermost periphery of the filler neck.

4. The closure system of claim 1, wherein the closure cap has a valve to aerate to prevent negative pressure in the fuel tank and/or deaerate to prevent overpressure in the fuel tank.

5. The closure system of claim 1, wherein the closure cap has a lock on an upper face thereof.

6. The closure system of claim 5, wherein the lock comprises a self-closing lock flap to conceal the lock.

7. The closure system of claim 5, wherein the lock comprises a self-closing lock flap to conceal a locking cylinder and a locking bolt.

8. The closure system of claim 1, wherein the guide socket further includes a flap carrier, concentrically arranged therein, for supporting the self-closing, spring-actuated tank flap.

9. The closure system of claim 1, wherein the guide socket further includes:
   a flap carrier, concentrically arranged in the carrier, for supporting the self-closing, spring-actuated tank flap.

10. A closure system for a fuel tank, the closure system comprising:
    a filler neck having a sidewall with a pair of cams extending radially inward from the sidewall at opposing circumferential sides, and apertures and holes extending radially therethrough, wherein the holes are to deaerate the fuel tank during a filling sequence of the fuel tank;
    a guide socket arranged concentrically inside of the filler neck with a portion thereof spaced from the filler neck, the guide socket having: lugs received by the apertures to fix and position the guide socket body relative to the filler neck, a carrier concentrically arranged therein, a self-closing, spring-actuated tank flap connected to the carrier, and a replaceable filter connected to the carrier;
    a closure cap fastenable to the filler neck to be arranged between the filler neck and the guide socket, the closure cap having a sealing housing concentrically arranged in the space between the guide socket and the filler neck, the sealing housing having an annular groove in a sidewall thereof and a pair of bayonet ramps at an outer surface thereof into which the cams are guided to fasten the closure cap to the filler neck;
    a first seal to be received in an annular groove of the sealing housing, and which is secured to an inner face of the filler neck; and
    a second seal at the closure cap and arranged at an outer diameter of the filler neck,
    wherein the first seal is arranged between the filler neck and the guide socket such that a nozzle placed between the filler neck and the guide socket does not reach thereto.

11. The closure system of claim 10, wherein the second seal comprises a sealing lip.

12. The closure system of claim 10, wherein the guide socket further includes a flap carrier, concentrically arranged therein, for supporting the self-closing, spring-actuated tank flap.

13. The closure system of claim 10, wherein the guide socket further includes:
    a flap carrier, concentrically arranged in the carrier, for supporting the self-closing, spring-actuated tank flap.

14. A closure system for a fuel tank, the closure system comprising:
    a filler neck having a sidewall with a pair of cams extending radially inward from the sidewall at opposing circumferential sides, and apertures and holes extending radially therethrough, wherein the holes are to deaerate the fuel tank during a filling sequence of the fuel tank;
    a guide socket arranged concentrically inside and having a portion thereof concentrically spaced from the filler neck, the guide socket having: lugs received by the apertures to fix and position the guide socket relative to the filler neck, a carrier concentrically arranged therein, a self-closing, spring-actuated tank flap connected to the carrier, and a replaceable filter connected to the carrier;
    a closure cap having a valve to aerate to prevent negative pressure in the fuel tank and/or deaerate to prevent overpressure in the fuel tank, the closure cap having on an upper face thereof a lock that includes a self-closing lock flap to conceal a locking cylinder and a locking bolt; and a sealing housing for connection to the closure cap, and which is concentrically arranged in the space between the filler neck and the guide socket, the sealing housing having a pair of bayonet ramps at an outer surface thereof into which the cams are guided to fasten the sealing housing to the filler neck.

15. The closure system of claim 14, wherein the guide socket further includes a flap carrier, concentrically arranged therein, for supporting the self-closing, spring-actuated tank flap.

16. The closure system of claim 14, wherein the guide socket further includes:

a flap carrier, concentrically arranged in the carrier, for supporting the self-closing, spring-actuated tank flap.

\* \* \* \* \*